United States Patent [19]

Boot

[11] Patent Number: 4,564,938
[45] Date of Patent: Jan. 14, 1986

[54] DIGITAL ELECTRONIC SWITCHING SYSTEMS

[75] Inventor: Gordon P. Boot, Cotgrave, England

[73] Assignee: Plessey Overseas Limited, Ilford, England

[21] Appl. No.: 532,095

[22] Filed: Sep. 14, 1983

[30] Foreign Application Priority Data

Sep. 15, 1982 [GB] United Kingdom ............... 8226237

[51] Int. Cl.$^4$ ............................................ H04Q 11/00
[52] U.S. Cl. ................................. 370/85; 179/18 ES
[58] Field of Search ............... 370/85, 58; 179/18 ES, 179/98

[56] References Cited

U.S. PATENT DOCUMENTS

| | | | |
|---|---|---|---|
| 3,916,108 | 10/1975 | Schwartz | 370/85 |
| 3,963,870 | 6/1976 | Couder et al. | 370/85 |
| 4,320,502 | 3/1982 | deVeer | 370/85 |
| 4,331,834 | 5/1982 | Ganz et al. | 179/18 ES |
| 4,331,835 | 5/1982 | Gueldner et al. | 179/18 ES |
| 4,340,775 | 7/1982 | Gesek et al. | 370/85 |
| 4,340,776 | 7/1982 | Ganz et al. | 179/18 ES |
| 4,373,183 | 2/1983 | Means et al. | 370/85 |
| 4,380,052 | 4/1983 | Shima | 370/85 |
| 4,408,300 | 10/1983 | Shima | 370/85 |
| 4,445,193 | 4/1984 | Mueller et al. | 370/85 |
| 4,451,881 | 5/1984 | Grice et al. | 370/85 |
| 4,463,351 | 7/1984 | Chiarottino | 370/85 |

Primary Examiner—Robert L. Griffin
Assistant Examiner—Kenneth I. Rokoff
Attorney, Agent, or Firm—Fleit, Jacobson, Cohn & Price

[57] ABSTRACT

An electronic switching system in which digital data is required to be exchanged between two pieces of electronic apparatus such as two telephone subscribers, in which a parallel time division multiplex highway is used to carry the data, the highway being divided into two paths, the data being transferred in both directions during a single time period using the different paths for each direction, identification of the transmitting and receiving parties being by use of two address buses in a single time slot period.

5 Claims, 2 Drawing Figures

DIGITAL ELECTRONIC SWITCHING SYSTEMS

The present invention relates to digital electronic switching systems and more particularly such switching systems wherein data is stored in digital form.

In particular the present invention relates to systems whereby data is passed between one piece of apparatus and another using a common highway. With such systems the size of the common highway limits the amount of data which can be passed between any two pieces of the apparatus simultaneously and it is an object of the present invention to provide a highway control system which increases the amount of data which may be transferred in comparason with previous similar systems.

SUMMARY

According to the present invention there is provided a digital electronic switching system including a plurality of first and second electronic apparatus connected via a plurality of respective third and fourth electronic apparatus to a time division multiplex highway, in which the time division multiplex highway comprises a first and second parallel address bus and a parallel data bus, in which the first and second address buses are connected to respective first and second address memories, including address decoding means in said third and fourth electronic apparatus for decoding addresses on the respective first and second address buses to identify the particular first and second apparatus to be actuated in a particular time slot, in which the data bus is divided into two parallel buses and in which data is transferred in both directions between said particular first and second electronic apparatus along said divided bus in a single time slot period.

BRIEF DESCRIPTION OF THE DRAWINGS

Embodiments of the present invention will now be described by way of example with reference to the accompanying drawings in which.

DETAILED DESCRIPTION

Figure 1:
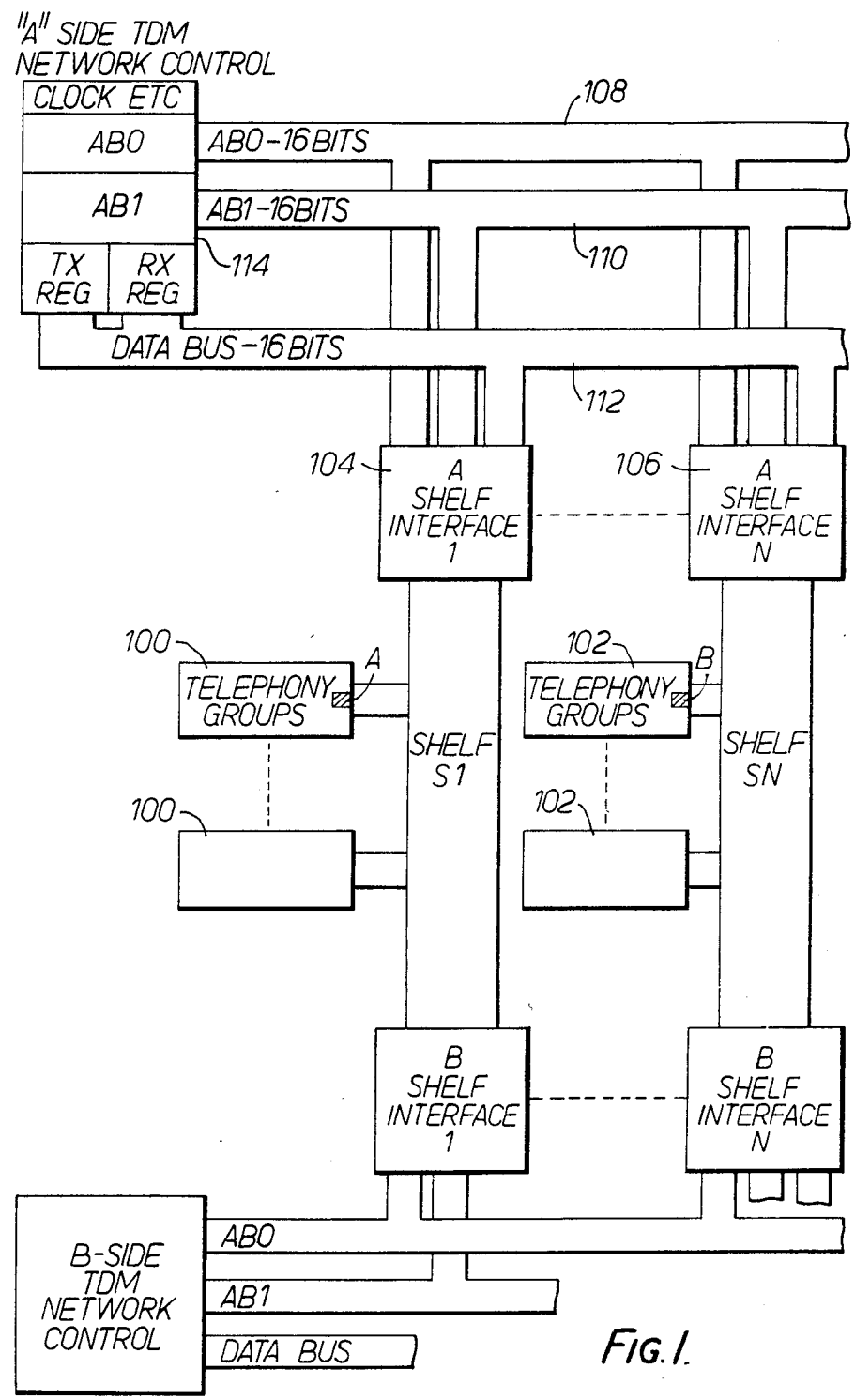
FIG. 1 shows in block diagrammatic form apparatus according to the present invention.

Referring now to FIG. 1, a number of telephony groups 100 are connected to a shelf S1 and a further number of telephony groups 102 are connected to a shelf SN. Each shelf is connected on the A side via a respective shelf interface 104, 106 to three highways 108, 110, 112. Highway 112 is used as a data bus, and highways 108 and 110 are used as address buses AB0 and AB1 respectively. An A side controller 114 is provided to control the passage of data.

At the bottom of the figure a similar arrangement is connected for the B side which operates in the same manner as the A side above described.

Figure 2:
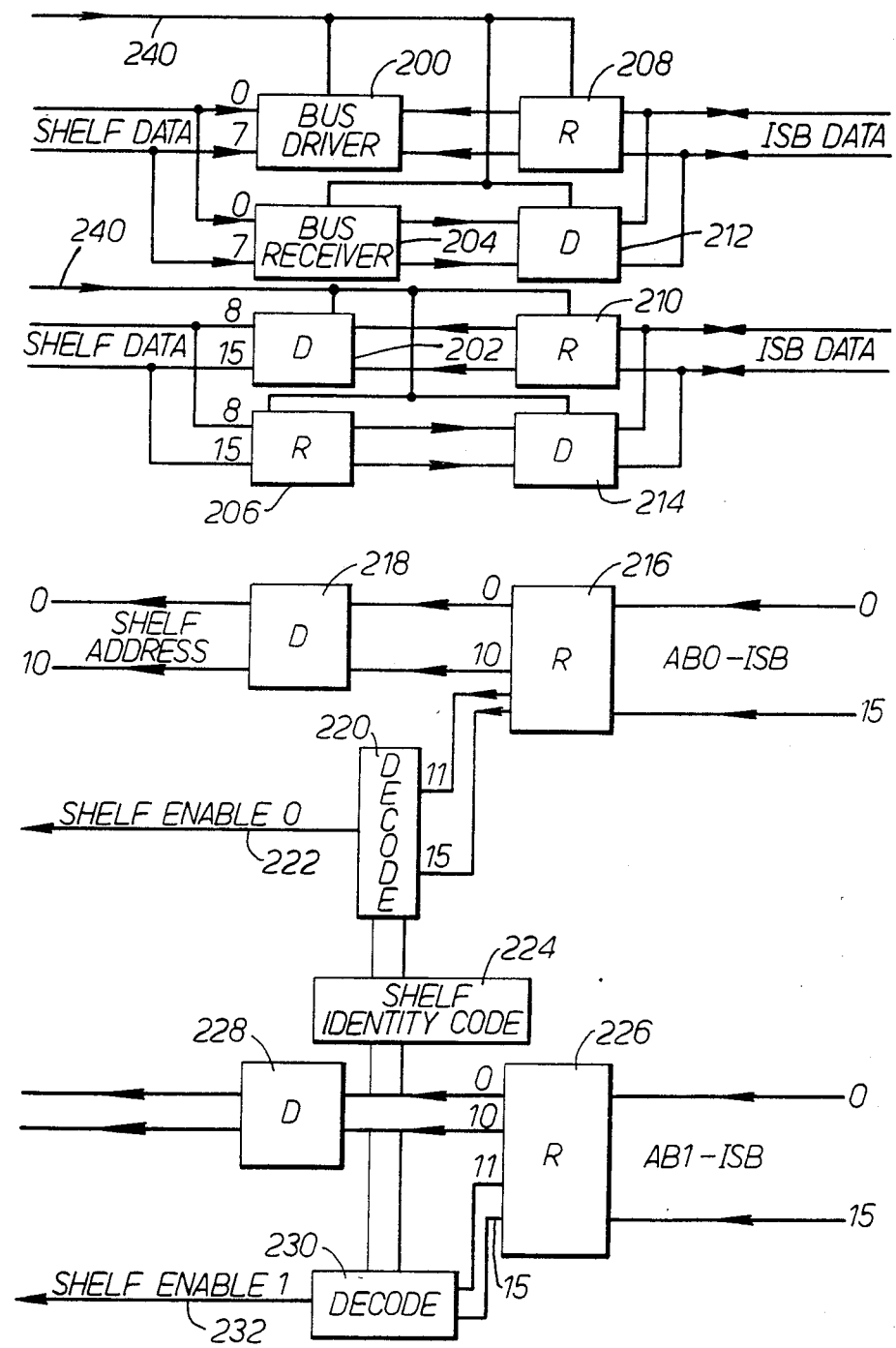
FIG. 2 shows in block diagrammatic form the shelf interfaces of FIG. 1 in great detail.

With reference now to FIG. 2 the shelf interface 104 for example is shown in greater detail. All shelf interfaces will be substantially identical in operation. Shelf data is fed in two eight bit parts (0-7 and 8-15) as shown to bus drivers 200, 202 and bus receivers 204, 206. Bidirectional access to the intershelf bus (ISB) data bus 112 is obtained via respective receivers 208, 210 and drivers 212, 214 as shown With respect to shelf address bus AB0 bits 0-15 are fed to a receiver 216 in which bits 0 to 10 are divided out and fed to a driver 218 and bits 11 to 15 are fed to a decoder 220. Decoder 220 provides a shelf enable signal on line 222 and is connected to a shelf identity code circuit 224.

Address bus AB1 is connected in a similar manner as shown to receiver 226, which is connected to driver line 228 and decoder 230 to provide a shelf enable signal on line 232.

To establish a bidirectional connection between two telephony code channels, for example A and B on shelves S1 and SN as shown in FIG. 1, an entry in AB0 and AB1 is made. The entry in AB0 is telephony channel A and in AB1 is channel B. There are 512 different entry addresses for both AB0 and AB1. The entries for the above connection are inserted at the same location eg. time shot 20.

The data is transferred as defined by the following tables 1 and 2.

TABLE 1

| TIME/SLOT | AB0 | AB1 | DATABUS 0-7 | DATABUS 8-15 |
|---|---|---|---|---|
| 19 | A address received by expander. | B address received by expander. | | |
| 20 | Address of A. onto shelf bus | Address of B. onto shelf bus | | |
| 21 | Time slots used for other connections. | Time slots used for other connections. | Data A out. | Data B out. |
| 22 | | | Data out to ISB. | Data out to ISB. |
| 23 | | | Data A onto shelf N. | Data B onto shelf 1 |

TABLE 2

| TIME/SLOT | SHELF 1 Lower Byte | SHELF 1 Upper Byte | INTER SHELF BUS Lower | INTER SHELF BUS Upper | SHELF N Lower | SHELF N Upper |
|---|---|---|---|---|---|---|
| TS 20 | X | X | X | X | X | X |
| TS 21 | A group Data out | X | X | X | X | B group Data out |
| TS 22 | X | X | A group Data out | B group Data out | X | X |
| TS 23 | | B group Data | X | X | A group | X |

TABLE 2-continued

| | DATA BUS | | | | | |
|---|---|---|---|---|---|---|
| | SHELF 1 | | INTER SHELF BUS | | SHELF N | |
| TIME/SLOT | Lower Byte | Upper Byte | Lower | Upper | Lower | Upper |
| | Received | | | | Data Received | |

With reference to table 2, shelf 1 interface 104 drives out onto the lower data bus byte only and shelf N interface 106 drives out on the upper data bus byte only during time slot 21. If channel A and B reside on the same shelf then the shelf interface will transmit on both upper and lower data bus. The same shelf interface also receives both upper and lower data bus bytes.

In the idle state all shelf interfaces receive all data from the inter shelf bus (ISB) and drive the shelves. When a telephony card has data to be transmitted it is enabled by address signals on either AB0 or AB1. The telephony card then generates a signal to disable the shelf interface drivers 200, 202 and enable the shelf interface receivers 204, 206. Shelf data drives and receives the data which the telephony card generates. That shelf interface will then turn round and drive the shelf in the next time slot. Since all shelf interfaces receive the data including the driving shelf interface then in the next time slot all shelf interfaces drive the shelves with the new data.

Only the card nominated by the other address bus four time slots previously on the other address bus will receive and accept the data.

In the idle state all shelf interfaces 104, 106 receive all data from the intershelf bus 112 and this data is driven by drivers 200 to all shelves. When a telephony card such as A has data to be transmitted it is enabled for example in time slot 20—see Table 1 by the address AB0 or AB1 stored in the address memory in the time division multiplex network control 114. The telephony card then generates in this specific time clock period (20) a signal on line 240 which disables the shelf interface drivers 200, 202 and enables the interface receivers 204, 206 and drivers 212, 214. In next time slot (21) data from the addressed telephony card is transferred to the bus receiver 204 as the lower byte and is stored in the receiver 204. The inhibit pulse on line 240 is removed during the time slot 21. This is most easily accomplished by a clock which runs at twice the system data transfer clock rate and which enables the inhibit pulse to be applied half way through time slot 20 and removed halfway through time slot 21. Since any data transfer action must be commenced at the beginning of a time slot period the drivers 200, 202 are disabled for the whole of period 21.

During the next time slot 22 the data stored in the receiver 204 is output on the intershelf bus 112 and a "cross over" of data occurs with data A being received by shelf interface 106 (N) and data B being received by shelf interface 104 (1). (—see Tables 1 and 2).

The respective data is stored in the respective receivers 208, 210 of the shelf interfaces in time slot 22 and then in time slot 23 it is output on the respective shelf buses to the telephony cards from which cards the digital data is for example converted to analogue speech signals for reception by a subscribers telephone apparatus.

Thus data is transferred from one telephony card A to another telephony card B via a highway 112 in a series of four steps taking four clock pulse periods but the highway 112 is only used for a single clock pulse period. Thus data transfer via the highway is extremely efficient and this enables the telephone exchange to operate faster than in the prior art configuration where at least two time slots were necessary to pass data on the highway.

The system is preferably designed to run at a clock rate of 4.096 MHz. The traffic handling capacity of the system can be doubled by increasing the clock rate to 8.192 MHz and by driving the system clock on the shelf interfaces. The shelf interface must then be equipped with pipeline registers for early byte and late byte data transfers to the intershelf bus (ISB).

I claim:
1. A digital electronic switching system comprising:
(A) a plurality of first and second electronic apparatus;
(B) a plurality of third and fourth electronic apparatus;
(C) respective first data highways interconnecting said first and said second electronic apparatus to said third and fourth electronic apparatus; and
(D) a time division multiplex highway interconnecting said third and said fourth electronic apparatus; said time division multiplex highway including:
  (i) a first and second address bus, and
  (ii) a parallel data bus divided into two parallel buses for bi-directional data transfer between said third and said fourth electronic apparatus in a single time slot period of said time division multiplex highway;
in which said first and said second address buses are connected to
(E) a first and second address memory;
said third and said fourth electronic apparatus including:
  (i) address decoding means responsive to addressing from said first and said second address memories via said first and said second address buses in a first time slot of said time division multiplex highway to identify particular ones of said first and said second electronic apparatus to be actuated;
  (ii) means to cause said particular ones of said first and said second electronic apparatus to cause data held therein to be transferred via said first highway to said third and said fourth electronic apparatus in a second time slot of said time division multiplex highway;
  (iii) means to cause output of the data so transferred in the second time slot to said parallel data bus in a third time slot of the time division multiplexed highway; and
  (iv) means to cause transfer via the first highway of the data received in the third time slot to the first and second electronic apparatus in a fourth time slot of the time division multiplex highway; said address decoding means adapted to respond to addressing during said second, third and fourth time slots and said parallel data bus adapted to carry data during said first, second and fourth time slots.

2. A digital electronic switching system as claimed in claim 1 in which each respective connection between the first and second electronic apparatus and the third and fourth electronic apparatus includes a time division multiplex data highway divided into two parallel shelf data buses in which data is output from the first and second electronic apparatus on a first one of said two parallel shelf data buses and is input into said first and second electronic apparatus on the second one of said two parallel shelf data buses.

3. A digital electronic switching system as claimed in claim 2 in which the third and fourth electronic apparatus are identical and include a first bus driver and receiver, and receiver and driver combination for the passage of data to and from one of said parallel shelf data buses to one of said parallel data buses and a second bus driver and receiver, and receiver and driver combination for the passage of data to and from the other one of said parallel shelf data buses to the other one of said parallel data buses and in which each receiver includes storage means for storing the parallel data for one clock pulse period.

4. A digital electronic switching system as claimed in claim 3 including means for inhibiting the operation of the receivers connected to the parallel data buses when one of said first electronic apparatus connected to said third electronic apparatus is selected to transmit data onto said parallel data bus.

5. A digital electronic switching system as claimed in claim 4 in which said first and second electronic apparatus comprise telephony cards which store and forward speech stored in digital form from a first subscriber connected to said first electronic apparatus to a second subscriber connected to said second electronic apparatus.

* * * * *